United States Patent Office.

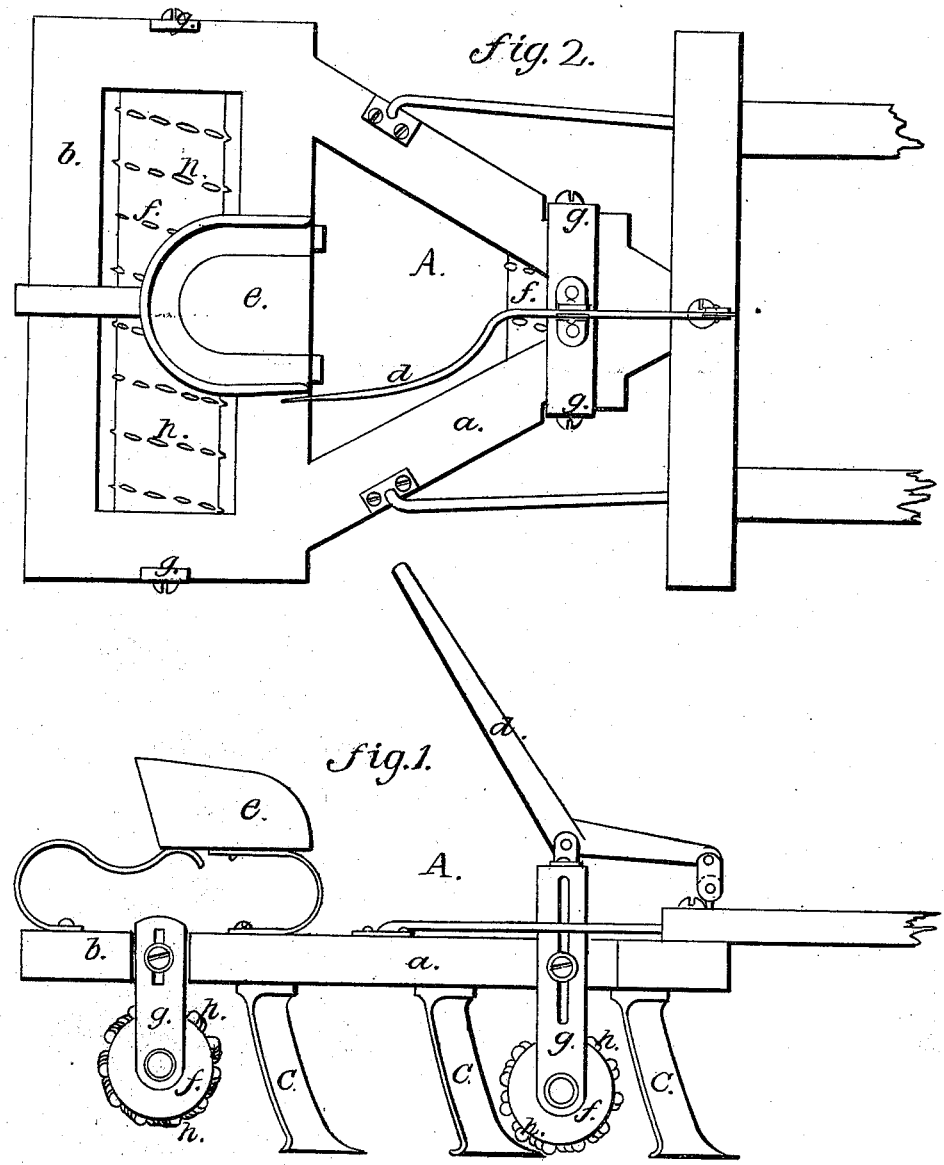

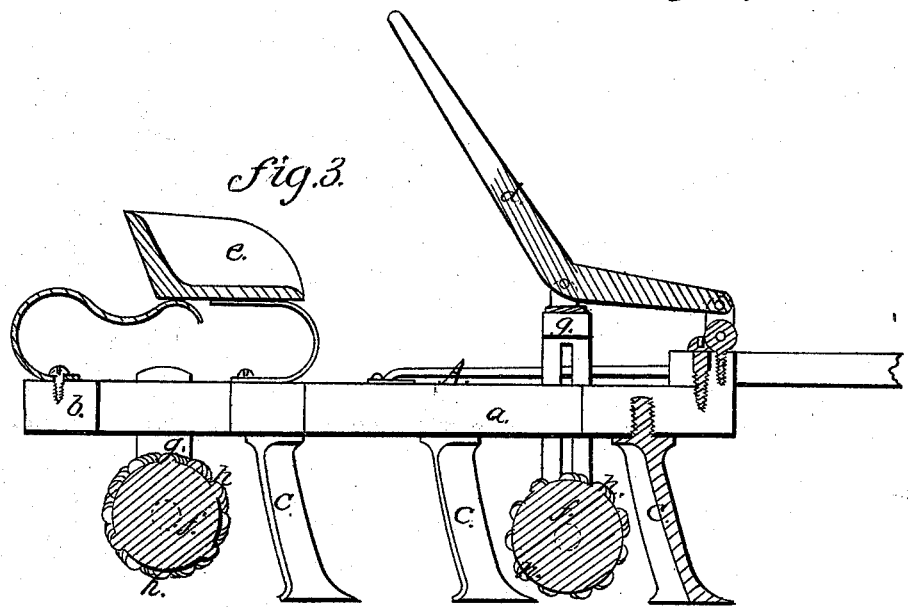
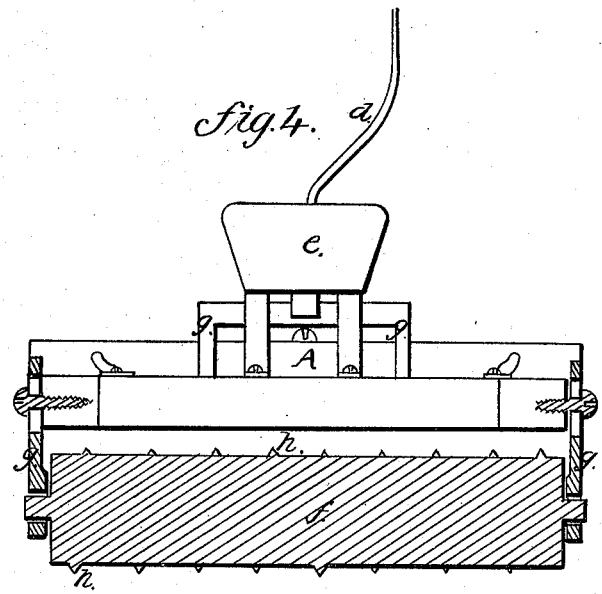

JAMES GOULD, OF LEXINGTON, MASSACHUSETTS.

Letters Patent No. 89,983, dated May 11, 1869.

IMPROVEMENT IN GRASS-RENOVATOR.

The Schedule referred to in these Letters Patent and making part of the same.

*To all to whom these presents shall come:*

Be it known that I, JAMES GOULD, of Lexington, in the county of Middlesex, and State of Massachusetts, have made an invention of a new and useful Implement or Grass-Renovator; and do hereby declare the following to be a full, clear, and exact description thereof, due reference being had to the accompanying drawings, making part of this specification, and in which—

Figure 1 is a side elevation;
Figure 2, a plan;
Figure 3, a vertical and longitudinal section;
Figure 4, a transverse section through the rear roller, to be hereinafter described.

This invention relates to means for renovating old grass-lands, such as lawns and croquet-grounds, the sod of which has been undisturbed for a considerable length of time, and where it is desirable to improve the grass without the necessity of the disuse of such turf or sod, and the annoyance and expense, as well as loss of time attending the breaking up and sowing of the land in the usual manner, the object of the invention being also to unearth and sprout seeds which lie dormant in the soil, and which otherwise would not germinate.

The invention consists in the employment of a triangular-shaped frame, carrying two converging rows of plow-shaped teeth, substantially in the form of ordinary cultivators, so called, and in combining with such cultivator one or more cylinders or drums, provided with a spirally-arranged series of short, sharp knives, encircling the periphery of the cylinders or drums, the purpose of these cylinders being to reduce and level the furrow of the earth thrown up by the cultivator-teeth, but more especially to cut small indentations into the sod or turf between the furrows made by the cultivator-teeth, in order that a proper fertilizer shall incorporate with the soil below the grass of the turf, and by coming in contact with unsprouted seeds, cause them to germinate and perfect.

Referring to the accompanying drawings, making part of this specification, and illustrating my invention—

A denotes a cultivator, made substantially in the ordinary form of such implements, with the exception that its triangular frame *a* has a rectangular extension, *b*, at its rear end, for the purpose to be hereinafter explained.

The teeth of the renovator are shown at *c c c*, &c., its draught-bar being shown at *d*, and its driver's seat at *e*.

*f f* are two rollers or drums, disposed transversely of the frame of the inplement, the journals of such cylinders or drums being supported in adjustable boxes or bearings *g g*, applied to opposite sides of the frame, and so that one roller is situated at or near the forward end of the implement, while the other roller is at the rear part thereof, the object of the adjustable boxes being to vary the height of the rollers with respect to the renovator-teeth.

Although shown in the accompanying drawings as applied respectively between the first three teeth, and in rear of the last teeth of the implement, the rollers *f f* may be placed in any convenient position, as necessity or convenience may determine to be best.

The said cylinders *f f* are provided upon their peripheries with a row of short teeth, or cutting-knives, *h h*, &c., arranged preferably in a spiral line about such peripheries, and from end to end, or thereabouts, of the cylinders, these knives being of any suitable shape, but as shown in the present instance, being about semicircular in their longest axis, and with sharp outer edges.

The bearings of the rollers *f f* are to have a suitable means of adjusting their height, the forward o e, especially, being provided with a means for lower ng such roller sufficiently to raise the forward end of the implement, and consequently elevate the teeth *c c c* from contact with the soil.

The fertilizer for enriching the soil, and the seeds to be deposited therein, when necessary, are to be applied to the implement in such manner as may be hereinafter determined, either separately or mixed together in suitable proportions.

I have contemplated placing the fertilizer or seeds separately, or together, as circumstances may require, within the rear drum of the implement, and providing the drum with outlets and valves, or gates, for regulating the passage of such fertilizer or seeds.

It may be found, in many instances, desirable to employ the toothed cylinders alone, and dispense with the use of the cultivator-teeth.

To effect this, it is only necessary to raise the forward end of the cultivator-frame, and elevate its teeth sufficiently high above the surface of the rod to prevent their touching it.

Furthermore, it may be found in many instances desirable to deposit the fertilizer or the seeds alone, as well as together; hence the reference to the idea of providing separate receptacles for the same.

The implement above described is to be drawn along the surface of the ground, and if the cultivator-teeth are depressed, will break up the ground into small furrows, with unbroken portions of turf between.

The rollers have the effect of reducing the soil raised by the cultivator-teeth to about the level of the turf, while the knives of the cylinder have the effect of indenting both the soil and the turf, for reception of the fertilizer or seeds, or both.

Should the cultivator-teeth be raised above the surface of the turf, the knives will indent the body of the turf sufficiently to allow the deposit of a small quantity of fertilizer, or seeds, as the case may be, and thus renew the grass, without disturbing, to any perceptible extent, its general surface.

One great value of raising the cultivator-teeth off the ground is, to enable the entire implement to be readily and expeditiously turned around.

I claim as my invention, and desire to secure by Letters Patent—

1. Combining with a cultivator, otherwise of ordinary or proper construction, one or more rollers or drums, provided with a series of projections or teeth, essentially in manner and for the purpose as before explained.

2. The construction of a cultivator, when provided with the rollers above mentioned, whereby the teeth of such cultivator may be readily raised above the surface of the ground, in manner and to operate as specified.

JAMES GOULD.

Witnesses:
EDWARD GRIFFITH,
H. G. PARKER.